(12) United States Patent
Bradley (10) Patent No.: US 7,007,161 B2
(45) Date of Patent: Feb. 28, 2006

(54) FAST BOOTING OF PLEX ARRAY

(75) Inventor: William Mitchell Bradley, Austin, TX (US)

(73) Assignee: Agile TV Corporation, Menlo Park, CA (US)

( * ) Notice: Subject to any disclaimer, the term of this patent is extended or adjusted under 35 U.S.C. 154(b) by 445 days.

(21) Appl. No.: 10/338,441

(22) Filed: Jan. 7, 2003

(65) Prior Publication Data

US 2003/0131225 A1 Jul. 10, 2003

Related U.S. Application Data

(60) Provisional application No. 60/346,899, filed on Jan. 8, 2002.

(51) Int. Cl.
*G06F 9/445* (2006.01)
(52) U.S. Cl. .............................. 713/2; 713/1; 709/222
(58) Field of Classification Search .................... 713/1, 713/2; 709/222
See application file for complete search history.

(56) References Cited

U.S. PATENT DOCUMENTS

| 5,029,075 | A | * | 7/1991 | Hirasawa | 709/241 |
| 5,367,688 | A | * | 11/1994 | Croll | 709/222 |
| 5,487,066 | A | * | 1/1996 | McNamara et al. | 370/436 |
| 5,842,034 | A | * | 11/1998 | Bolstad et al. | 712/11 |
| 6,724,781 | B1 | * | 4/2004 | Dupont | 370/535 |

* cited by examiner

*Primary Examiner*—Lynne H. Browne
*Assistant Examiner*—Anand B. Patel
(74) *Attorney, Agent, or Firm*—Glenn Patent Group; Michael A. Glenn (57) ABSTRACT

A method for fast booting an operation system on multiple processors coupled in multi-dimensional array architecture with higher efficiency and reliability. A particular PLEX™ node, which is designated as a primary boot master node, receives a sequence of data packets containing a boot image program to be used to boot the operating system. It first forwards a copy of each data packet to various selected neighboring nodes to which the primary boot master node is directly connected. The nodes that have received the data packets from the primary boot master node further forward the data packets to various other selected nodes, until all the PLEX™ nodes have succeeded in loading the entire boot image program. Three schemes are developed, which improve booting efficiency by allowing all PLEX™ nodes to receive the operating system as close to simultaneously as possible under certain constraints of the way that the PLEX™ nodes are interconnected.

51 Claims, 9 Drawing Sheets

FAST BOOTING OF PLEX ARRAY

CROSS-REFERENCE TO RELATED APPLICATION

This application claims priority to U.S. Provisional Patent Application No. 60/346,899 filed on Jan. 8, 2002.

BACKGROUND OF THE INVENTION

1. Technical Field

The invention relates generally to methods for initializing an operating system on multiprocessor system, and more particularly to a method for fast booting an operating system on communications processors coupled in a multi-dimensional array architecture.

2. Description of Prior Art

A computer operating system is an integrated set of specialized programs that is used to control the execution of application programs running on the computer. Typically, an operating system manages the interaction of the computer hardware and software by providing services to the software applications such as resource allocation, scheduling of tasks, data management and input and output (I/O) control. When a computer is turned on, the operating system is loaded into main computer memory by a set of instructions normally contained within ROM. This process is called booting or initial program loading. A single-processor computer usually undergoes a booting routine that is controlled by a computer program that performs various tasks such as loading an operating system into the memory, checking memory for defects, and loading software drivers needed for equipment associated with the computer.

A multiprocessor computer, by definition, contains multiple processors that can execute multiple parts of a computer program or multiple programs simultaneously. In general, this parallel computing executes computer programs faster than conventional single processor computers that execute the parts of a program sequentially. When a multiprocessor computer system is first powered on or otherwise rest, the processors in the system are initialized by setting them to a known state. The reset causes a processor to jump to the system basic input/output systems (BIOS) to begin code execution. The BIOS brings the system through an initialization or booting procedure whereby diagnostic routines are run on the system hardware, such as memory and the processors. After the initialization or booting procedure is complete, an operation system is loaded onto the computer system.

In a typical multiprocessor system, operating system allocates high-speed communication to one processor and uses the other processor for more computationally intensive tasks, such as image processing algorithms. Operating system often provides real-time event-driven software tools to aid in the control of such computing systems. Operating system may further provide real-time event-driven software tools supporting message passing to organize communication between concurrent tasks or objects, which may reside in different processors.

As multiprocessor systems increase in complexity, the booting scheme correspondingly becomes more sophisticated. This is especially true for advanced multinode multiprocessor systems. Various booting methods have been developed. However, these methods are limited by the systems architecture. In other words, a booting scheme for one system architecture generally cannot be used in other system architecture.

U.S. Pat. No. 5,867,702 discloses a method for initializing a multiprocessor system. The method includes providing a first portion of boot code to multiple processors for execution, selecting a first processor, the selection based on which of the multiple processors first successfully executes the first portion of the boot code, providing a second portion of the boot code only to the first processor, and the first processor executing the second portion of the boot code to configure the multiprocessor system.

U.S. Pat. No. 5,938,765 discloses another method for initializing a shared-memory, multinode multiprocessor computer system. The nodes in the multiprocessor computer system separately and independently run standard PC-based BIOS routines in parallel for initialization of the nodes. These BIOS routines set addresses of hardware components on each node as though the nodes are in a single-node environment. After completion of BIOS, the addresses of the hardware components are reprogrammed to conform to the multinode environment. A master processor then takes control to boot the operating system on the multimode environment.

U.S. Pat. No. 6,012,142 discloses another method for booting a multiprocessor system. The method includes transferring a message from external source through a first processor and from the first processor to a second processor, checking the message passed to the second processor without error, interpreting the message by a selected one of the first and second processors, and then performing boot operations by the selected processor in response to the interpretation of the message.

U.S. Pat. No. 6,058,475 discloses another method of booting a computer containing more than two processors. If a normal boot attempt fails, different processors are selected, one-at-a-time, for performing the boot routine. During the boot routine, all other processors are held inactive. After boot, processors are tested for health. Non-healthy processors are held inactive, and healthy processors are activated as usual.

These methods cannot be used or cannot be effectively used in initializing concurrent high-speed communication networks acting with multi-dimensional arrays of communications processors and nodes of such networks. What is desired is to develop an efficient and effective scheme for booting such networks.

SUMMARY OF THE INVENTION

The invention provides a method for fast booting an operating system on multiple processors that are coupled in a multi-dimensional array architecture. The invention provides higher efficiency and reliability. The goal is to make a PLEX™ array of nodes load the operating system faster. The baseline case is ripple booting, in which a particular PLEX™ node loads and executes the operating system, then various selected neighboring nodes load the operating system with the help of that first node, and so on until all the PLEX™ nodes have succeeded in loading the operating system from their immediate neighbors. Three schemes are developed, which improve booting efficiency by allowing all PLEX™ nodes to receive the operating system as close to simultaneously as possible under certain constraints of the way that the PLEX™ nodes are interconnected.

In Scheme A, the designated primary boot master node (P node) receives a sequence of data packets containing a boot image program from an external source such as a disk or another PLEX™ array and forwards the data packets to several secondary boot master nodes (S nodes). Communicatively, the S nodes are those that are directly coupled to the P node; geometrically, they are those that in a same row or same column with the P node. Then, the S nodes forward the data packets to the rest of the nodes, i.e., the tertiary nodes (T nodes) in such a way that if an S node is in a same row as the P node, then it forwards the data packet to the T nodes in a same column with this S node. If an S node is in a same column as the P node, then it forwards the data packets to the T nodes in a same row with this S node.

In Scheme B, the first forwarding stage is same as that in Scheme A. In the second stage, however, the S nodes perform the forwarding operations not only in the orthogonal direction as in Scheme A, but also in the direction along which they received the data packets. This scheme further increases fault tolerance because it permits an S node to receive the data packets in case where a link between the P node and the S node fails.

In Scheme C, the P node first forwards the data packets to the nodes that are in a same row as the P node. In the second stage, each S node forwards the data packets to the T nodes which are in a same column with the S node, and the P node, acting as an S node, further forwards the data packets to the T nodes which are in a same column with the P node.

DETAILED DESCRIPTION OF THE INVENTION

PLEX™ Array Architecture of Multiprocessor System

Figure 1A:
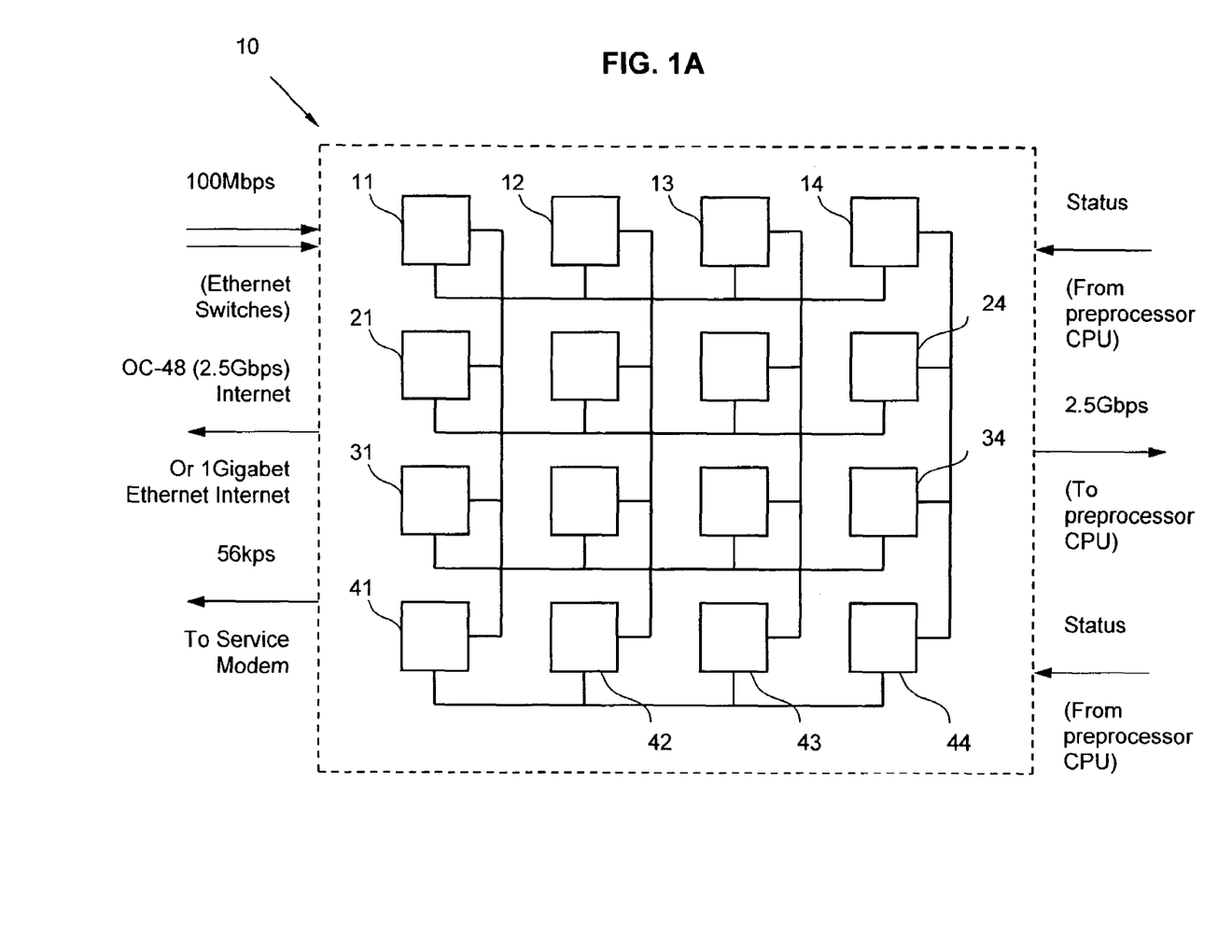
FIG. 1A is a block diagram illustrating an example architecture of a multiprocessor engine comprising a two-dimensional PLEX™ array of 4×4 nodes in accordance with the preferred embodiment.
Figure 1B:
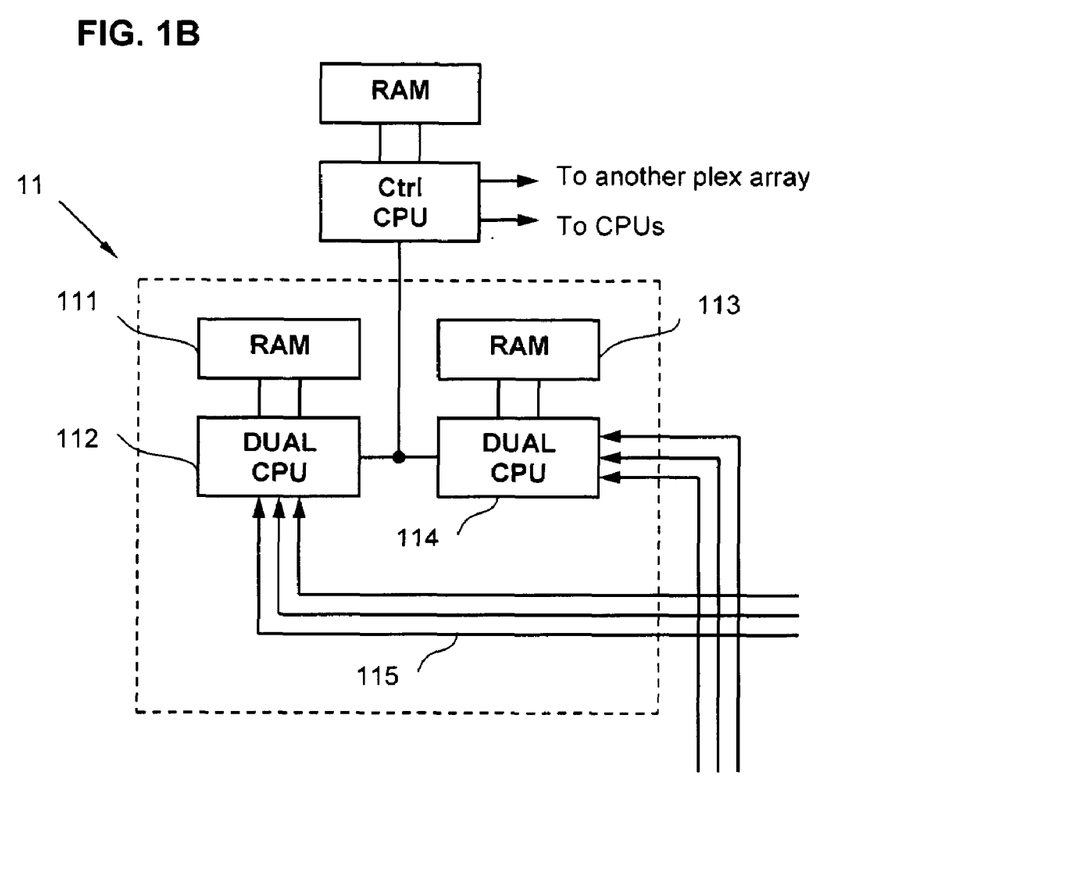
FIG. 1B is a block diagram illustrating the inner structure of a typical node in the PLEX™ array of FIG. 1A.

Illustrated in FIG. 1A is an example architecture 10 of a multiprocessor engine comprising a two-dimensional PLEX™ array of 4×4 nodes in accordance with the preferred embodiment. In this architecture, each node is communicatively coupled to the nodes located in a same row with it and to the nodes located in a same column with it. FIG. 1B is a block diagram illustrating the inner structure of node 11 as an example of a typical node in the PLEX™ array of FIG. 1A. Each node includes two processors 112, 114 and six ports 115. Each processor is coupled to an independent RAM 111, 113 and three ports 115.

The architecture 10 may have M orthogonal directions that support communications between an M dimensional lattice of up to $N^M$ nodes, where M is at least two and N is at least four. Each node pencil in a first orthogonal direction contains at least four nodes and each node pencil in a second orthogonal direction contains at least two nodes. Each of the nodes contains a multiplicity of ports.

As used herein, a nodal pencil refers to a 1-dimensional collection of nodes differing from each other in only one dimensional component, i.e. the orthogonal direction of the pencil. By way of example, a nodal pencil in the first orthogonal direction of a two-dimensional array contains the nodes differing in only the first dimensional component. A nodal pencil in the second orthogonal direction of a two-dimensional array contains the nodes differing in only the second dimensional component.

The architecture 10 represents a communications network that is comprised of a communication grid interconnecting the nodes. The communications grid includes up to $N^{(M-1)}$ communication pencils, for each of the M directions. Each of the communication pencils in each orthogonal direction corresponds to a node pencil containing a multiplicity of nodes, and couples every pairing of nodes of the node pencil directly.

As used herein, communication between two nodes of a nodal pencil coupled with the corresponding communication pencil comprises traversal of the physical transport layer(s) of the communication pencil.

Such embodiments of the invention advantageously support direct communication between any two nodes belonging to the same communication pencil, supporting communication between any two nodes in an M dimensional array in at most M hops.

Scheme A

Figure 2A:
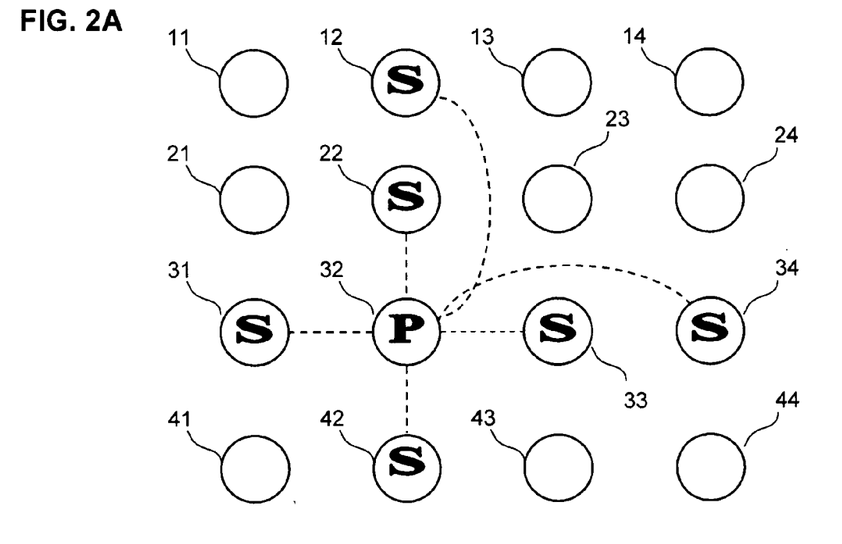
FIG. 2A is a schematic diagram illustrating the first stage of the booting process where the primary boot master node (P) forwards a sequence of data packets containing a boot image program to the secondary boot master nodes (S) which are communicatively coupled to the primary boot master node (P) according to Scheme A of this invention.

FIG. 2A is a schematic diagram of FIG. 1A illustrating a two-dimensional PLEX™ array of interconnected nodes wherein the dashed lines represent the first forwarding stage of the booting process according to Scheme A. Scheme A starts with designating one of the nodes, for example, node 32, as a primary boot master node (P32). This node is usually an I/O node or control node, but it can be any node that gets data from an external source such as a disk or a link to another array of processors. The nodes that are directly connected to P32 are designated as secondary boot masters (S nodes). In a typical two-dimensional PLEX™ array architecture, the S nodes are those in the same row as the primary boot master and also those in the same column. For instance, nodes 12, 22, 42, 31, 33, 34, are directly connected nodes of the primary boot master node P32. In the first stage, as the dashed lines indicated, P32 forwards a sequence of data packets containing a boot image program to the S nodes: P32→S31; P32→S33; P32→S34; P32→S22; P32→S42; and P32→S12. A data packet is a unit of content information enclosed in a wrapper that is used for convenience in transporting it. The boot image program is usually too large to be carried by one data packet. To transmit the entire boot image program, it must be broken down into small portions and each portion is enclosed in a wrapper. In this way, the entire boot image program is carried in a sequence of data packets. When the sequence of data packets is received, the program portions contained in the wrappers are combined back to the program and the wrappers are discarded.

In the first stage, P32 receives the data packets from an external source. It stores each received data packet in memory for later use in starting the operating system, and at the same time forwards each received data packet to the secondary boot masters. As a general rule, a second node does not send back the data packet to a first node from which the second node received the data packet. Here, the secondary boot masters S12, S22, S42, S31, S33, S34 do not send the data packet back to the primary boot master P32.

Figure 2B:
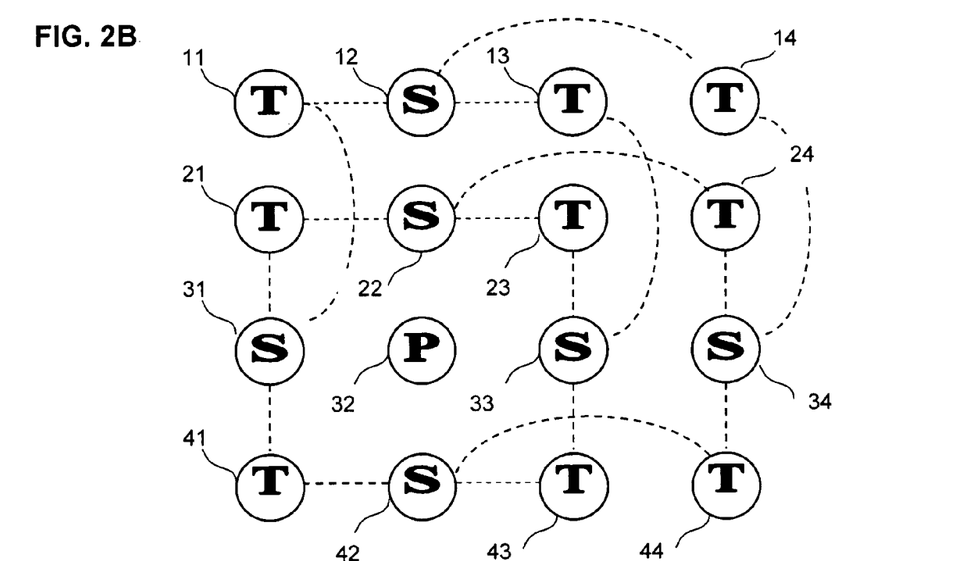
FIG. 2B is a schematic diagram illustrating the second stage of the booting process where each secondary boot master node (S) forwards the data packets to the tertiary nodes to which it is directly connected and which lie in the orthogonal direction from which the S node received the program according to Scheme A.

FIG. 2B illustrates the second stage of Scheme A where each S node forwards each received data packet to the directly connected nodes along the orthogonal direction. Each S node receives a data packet from the primary boot master P32, stores it in memory for later use, and at the same time forwards it to tertiary nodes (T nodes) to which the S node is directly connected and which lie in the orthogonal direction from which the S node received the data packet. As the dashed line indicated, an S node, which is in the same row of the primary boot master P32, forwards the data packet to the other nodes that are in the same column as the S node, i.e. S31→T41, T21, T11; S33→T43, T23, T13; S34→T44, T24, T14. Similarly, an S node, which is in the same column as the primary boot master P32, forwards the data packet to the other nodes in the same row as the S node, i.e. S42→T41, T43, T44; S22→T21, T23, T24; S12→T11, T13, T14. As a general rule, an S node does not forward the data packet to the nodes in the same row or the same column as the primary boot master P32. Here, S34 does not forward the data packet to S33; S12 does not forward the data packet to S22. The receiving and forwarding process is repeated until the entire sequence of data packets representing the entire boot image program is received and forwarded.

Figure 2C:
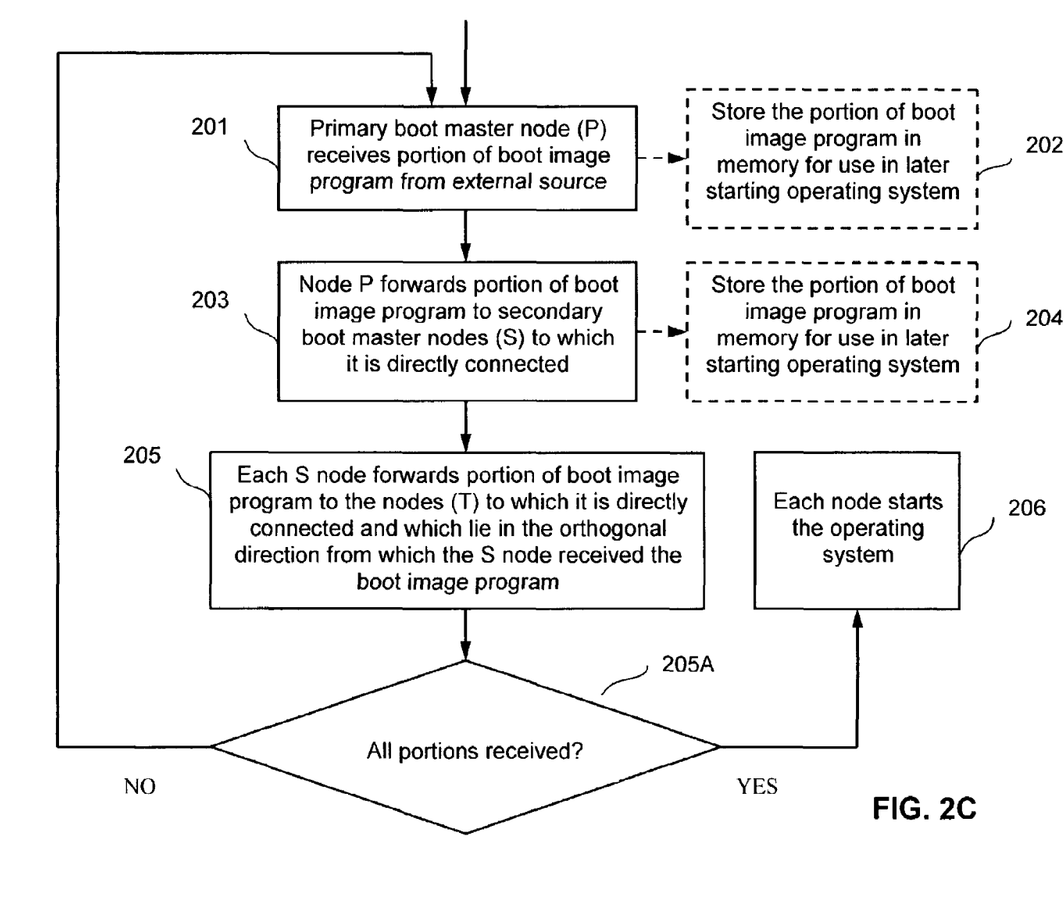
FIG. 2C is a flow diagram illustrating the booting sequence according to Scheme A.

FIG. 2C is a flow diagram illustrating the booting process according to Scheme A. The process includes the steps of:

201: The primary boot master node (P) receives a data packet containing a portion of a boot image program from an external source. (The boot image program is transported by a sequence of data packets, each of which contains a portion of the program;)

202: The P node stores the data packet in its memory for use in later starting the operating system;

203: At the same time with 202, or immediately thereafter, the P node forwards the data packet to the secondary boot master nodes (S) to which it is directly connected, i.e. the nodes located in the same row and the nodes in the same column as the P node;

204: Each S node stores the data packet in its memory for use in later starting the operating system;

205: At the same time with 204, or immediately thereafter, each S node forwards the data packet to the tertiary nodes (T) to which the S node is directly connected and which lie in the orthogonal direction from which the S node received the data packets;

205A: Repeat steps 201–205 until the entire boot image program has been received and forwarded; and 206: Start the operation system on each node.

Note that T nodes need not forward the data packets to any other nodes; they simply store the data packets in memory for later use. Each T node receives two copies of the data packets and may discard one copy.

With this scheme, all nodes in the PLEX™ array can receive the data packets at most two forwardings. An advantage of this scheme is that each T node receives packets from two different neighbors. This increases reliability in the presence of link faults. Another feature of this scheme is that the links between the P node and the various S nodes are idle during the second forwarding stage. For systems where the forwarding cannot be done simultaneously with the reception of the same data packet over the incoming link, i.e. the data packet must be received completely, stored, then forwarded, these idle links could be used to pipeline the first stage forwarding of the next data packet during the time that the second stage forwarding of the preceding data packet is occurring.

Scheme B

Figure 3A:
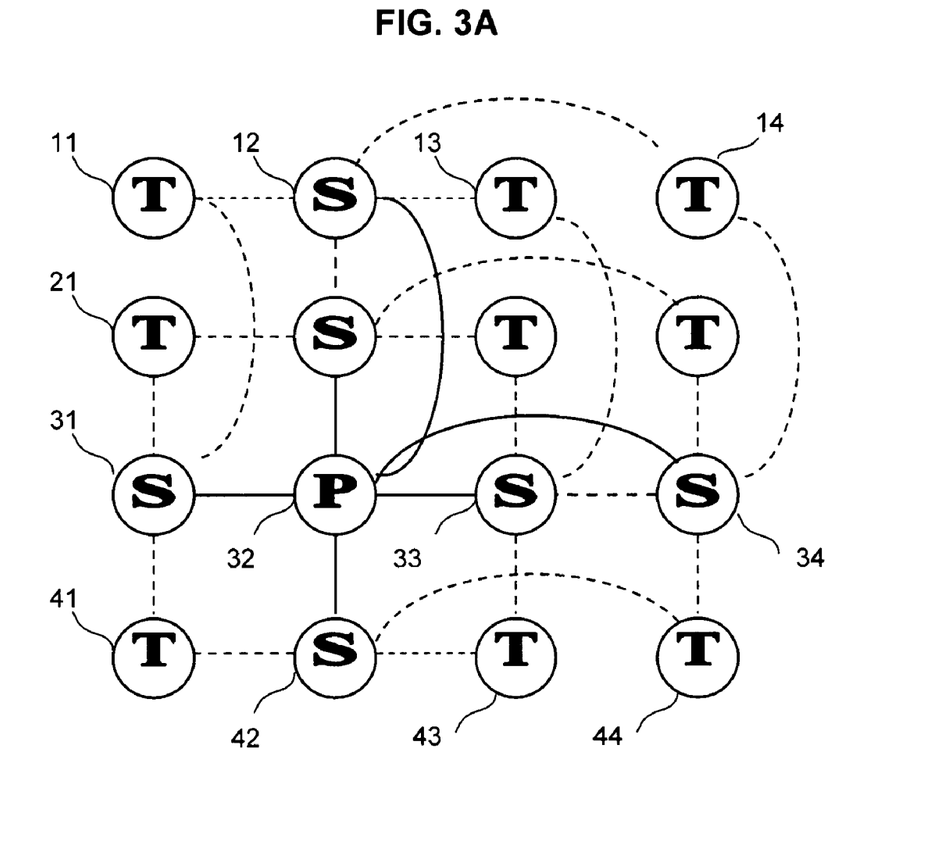
FIG. 3A is a schematic diagram illustrating the first stage by solid line and the second stage by dashed line of the booting process according to Scheme B.

FIG. 3A illustrates a booting process according to Scheme B, which is a variation of Scheme A. With the first stage in Scheme A, the P node, for example, node 32, forwards a sequence of data packets containing a boot image program to the S nodes, i.e. those in the same row as the P node and those in the same column as the P node. In the second stage, the S nodes perform the second forwarding operations not only in the orthogonal direction as in Scheme A, but also in the direction along which they received the data packets.

Scheme B further increases fault tolerance because it permits some S nodes to receive the data packets in cases where a link between the P node and the S node fails. For example, if the P32→S12 link fails, S12 may receive the data packets from S22; and if the P32→S34 link fails, S34 may receive the data packets from S33.

Figure 3B:
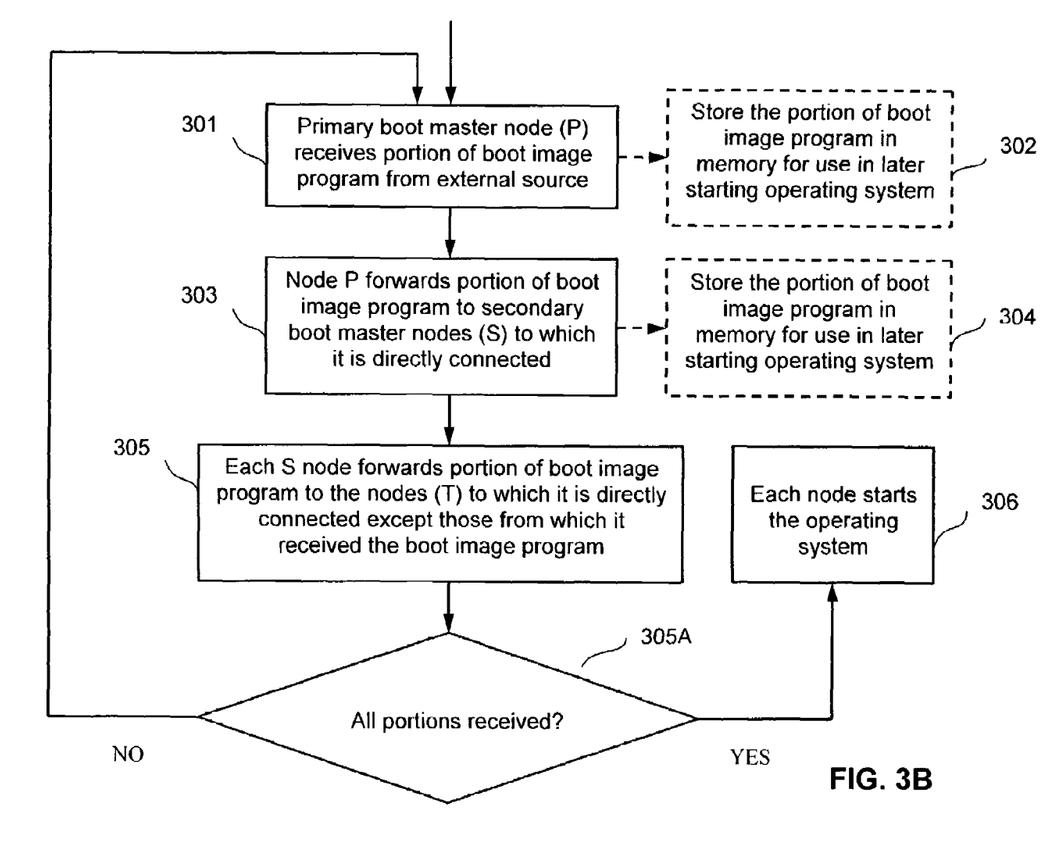
FIG. 3B is a flow diagram illustrating the booting sequence according to Scheme B.

FIG. 3B is a flow diagram illustrating the process according to Scheme B. The process includes the steps of:

301: The Primary boot master node (P) receives a data packet containing a portion of a boot image program from an external source. (The boot image program is transported by a sequence of data packets, each of which contains a portion of the program;)

302: P node stores the data packet in its memory for use in later starting the operating system;

303: At the same time with 302, or immediately thereafter, P node forwards the data packet to the secondary boot master nodes (S) to which it is directly connected, i.e. the nodes located in the same row and the nodes in the same column as the P node;

304: Each S node stores the data packets in its memory for use in later starting the operating system;

305: At the same time with 304, or immediately thereafter, each S node forwards the data packet to the nodes (T) to which it is directly connected and which lie in the orthogonal direction along which the S node received the data packet and to the nodes (T) to which it is directly connected and which lie in the direction along which the S node received the data packet;

305A: Repeat steps 301–305 until the entire boot image program has been received and forwarded; and 306: Start the operation system on each node.

Scheme C

Figure 4A:
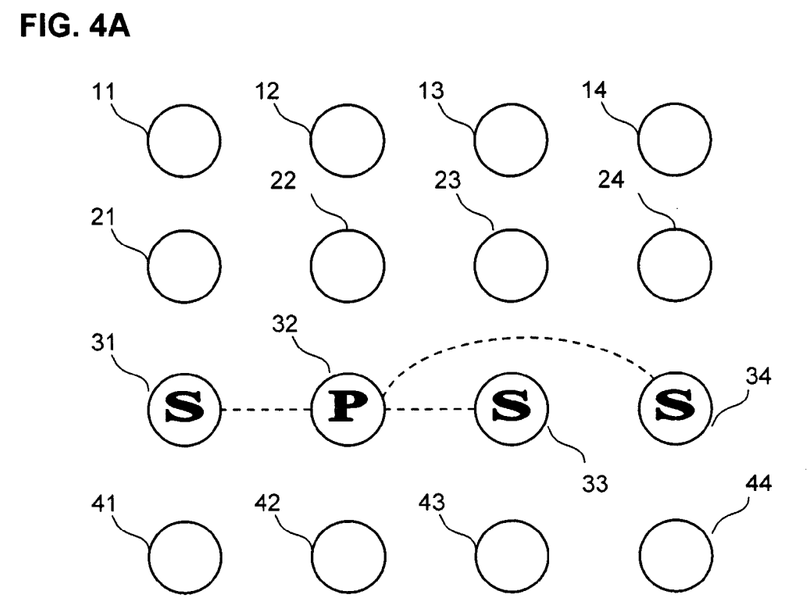
FIG. 4A is a schematic diagram illustrating the first stage of the booting process where the primary boot master node (P) forwards a sequence of data packets containing a boot image program to the nodes which are in the same row as the primary boot master node (P) according to Scheme C.
Figure 4B:
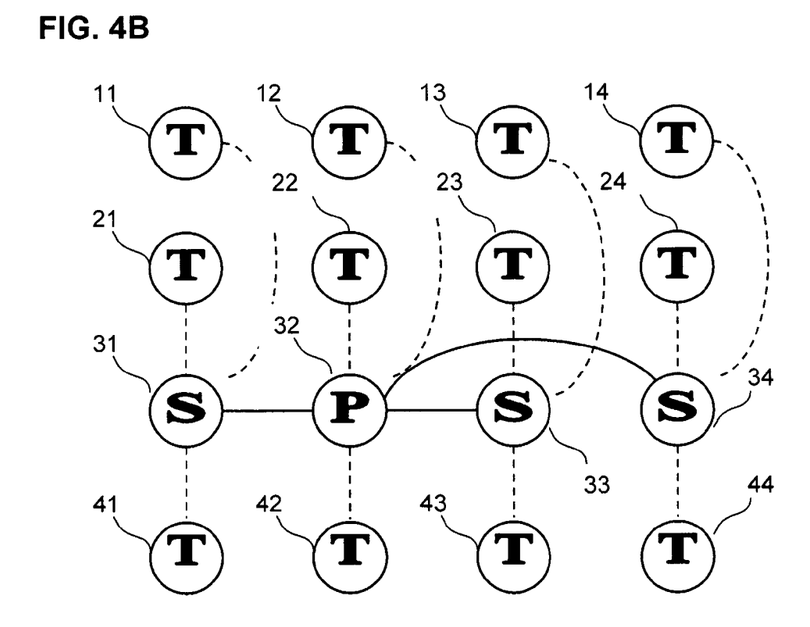
FIG. 4B is a schematic diagram illustrating the second stage of the booting process where each secondary boot master node (S) forwards the data packets to the nodes in the same column as this secondary boot master node (S) according to Scheme C.

In Scheme C, P32 first forwards a sequence of data packets containing a boot image program to the nodes in the same row as P32; and then each S node (P32 acts as an S node) forwards the data packets to the nodes in the same column as the S node. FIG. 4A illustrates the first stage of Scheme C where P32 forwards the data packets first along a row (P32→S31, S33, S34). FIG. 4B illustrate the second stage where P32 and the S nodes forward the data packets to the T nodes in the same column (S31→T41, T21, T11; P32→T42, T22, T12; S33→T43, T23, T13; S34→T44, T24, T14).

In Scheme C, only those nodes in the same row as P32 are designated as S nodes. At the second forwarding stage, P32 itself must take the role of an S node and forward along its column. Note that this scheme works equally well by reversing the roles of row and column.

Figure 4C:
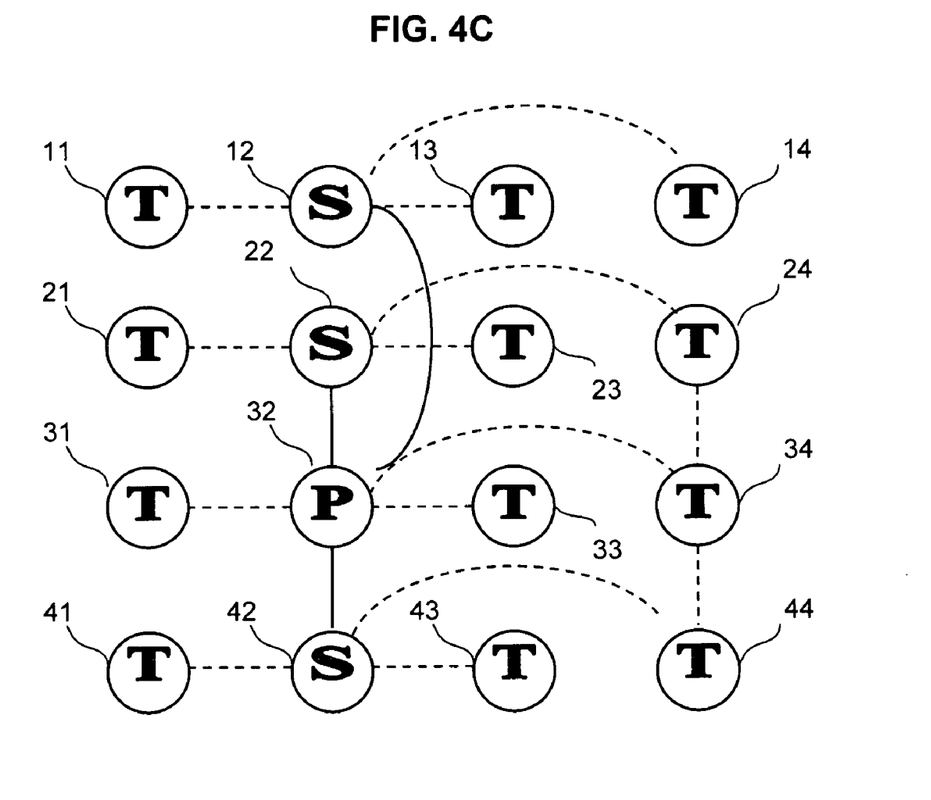
FIG. 4C illustrates an equivalent of Scheme C where the primary boot master node (P) first forwards the data packets to the nodes in the same column as the primary boot master node (P)

FIG. 4C illustrates an equivalent of Scheme C where P32 first forwards the data packets to the nodes in the same column as P32; and then each S node (P node 32 acts as an S node) forwards the data packets to the nodes in the same row as the S node. The solid lines represent the first forwarding (P32→S42, S22, S12) and the dashed lines represent the second forwarding (S12→T11, T13, T14; S22→T21, T23, T24; P32→T31, T33, T34; S32→T41, T43, T44).

An advantage of Scheme C is that P32 does not need to forward 6 packets, i.e. the packets to nodes 31, 33, 34, 12, 22, 42 as in Scheme A or B at once at the first forwarding stage. This may be important if the P node is incapable of simultaneously forwarding along rows and columns.

Figure 4D:
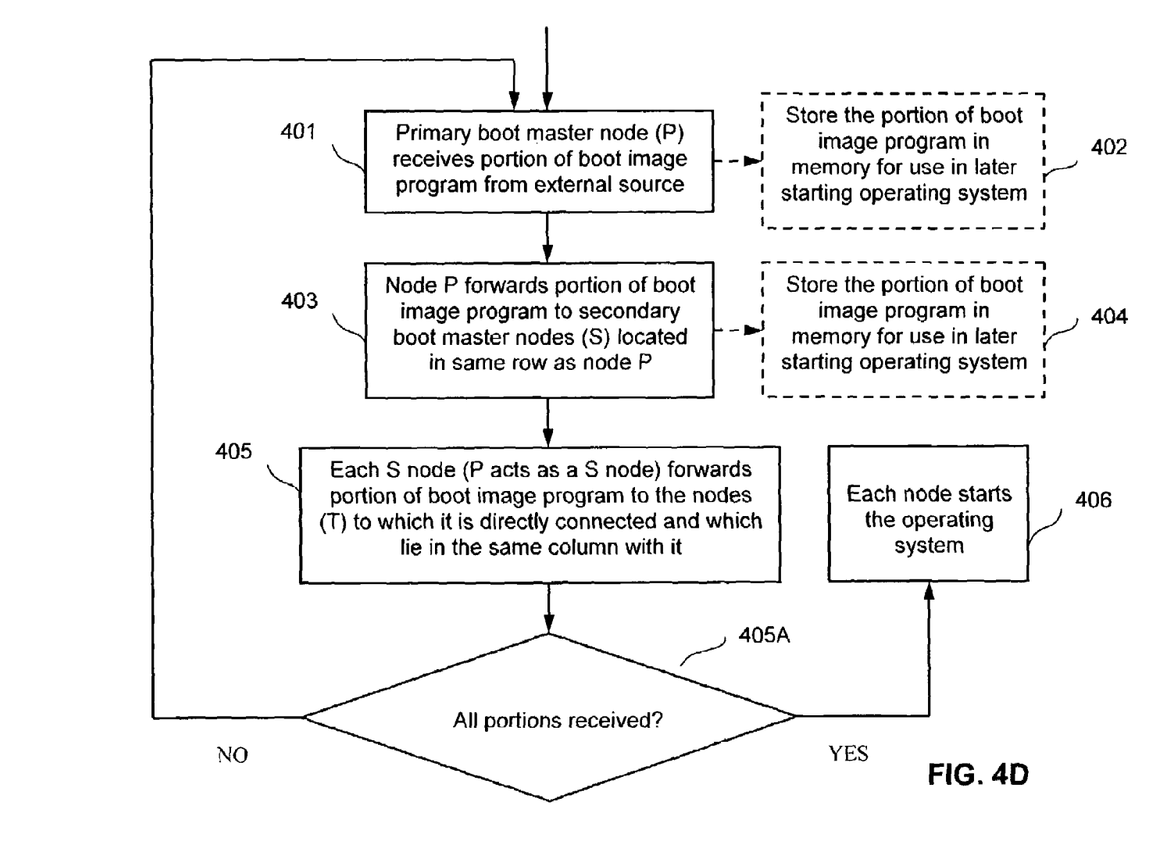
FIG. 4D is a flow diagram illustrating the method according to Scheme C.

FIG. 4D is a flow diagram illustrating the process according to Scheme C. The process includes the steps of:

401: The Primary boot master node (P) receives a data packet containing a portion of a boot image program from an external source. (The boot image program is transported by a sequence of data packets, each of which contains a portion of the program;)

402: The P node stores the received data packet in its memory for use in later starting the operating system;

403: At the same time with 402, the P node forwards the received data packet to the secondary boot master nodes (S) to which it is directly connected and which lie in same row as the P node;

404: Each S node stores the received data packet in its memory for use in later starting the operating system;

405: At the same time with 404, each S node forwards the received data packet to the T nodes to which it is directly connected and which lie in the same column with it. In this stage, the P node acts as an S node;

405A: Repeat steps 301–305 until the entire boot image program has been received and forwarded; and 406: Start the operation system on each node.

Hop Counting

Each data packet that carries a portion of the data packets may contain a hop count field that is incremented each time the data packet is forwarded. That permits an S node under Scheme B to determine that it has received a second-stage packet for the first time, in which case it must have missed the first stage packet that was sent to it directly from the P node. In this case, where the S node has not fulfilled its duty to send second-stage packets to its "T" neighbors, and it can fulfill that duty by sending third stage packets to them.

Further forwarding stages are possible, but are likely to be unnecessary for the usual case where most of the links are good.

Geometric Determination

Given the row, column location ("address") of the primary boot master node P, which can be stored in the data packets, each node can determine its role in the process by comparing its own address to P's address. Hop counting is not strictly necessary if a node can determine on which links a packet arrived and compare that to the expected arrival links based on that node's role.

If P's address is designated Rp, Cp (row and column) and a given N's address is Rn, Cn, Table 1 shows a node's role under Scheme A and Scheme B; Table 2 shows a node's role under Scheme C when S nodes are in the same row as the P node; and Table 3 shows a node's role under Scheme C when S nodes are in the same column as the P node.

TABLE 1

Scheme A and Scheme B

| Rn (Node's Row Address) | Cn (Node's Column Address) | Role |
| --- | --- | --- |
| Rp | Cp | P |
| Rp | Not Cp | S |
| Not Rp | Cp | S |
| Other wise | | T |

TABLE 2

Scheme B (Row First)

| Rn (Node's Row Address) | Cn (Node's Column Address) | Role |
| --- | --- | --- |
| Rp | Cp | P |
| Rp | Not Cp | S |
| Other wise | | T |

Table 3. Scheme B (Column First)

TABLE 3

Scheme B (Column First)

| Rn (Node's Row Address) | Cn (Node's Column Address) | Role |
| --- | --- | --- |
| Rp | Cp | P |
| Not Rp | Cp | S |
| Other wise | | T |

Acknowledgment Packets

The three schemes described herein can operate with explicit acknowledgement packets, in which case the acknowledgment packets can travel in the reverse direction along a link from which the packet came from. Another possibility is to dispense with acknowledgements. Any node that loses a packet or otherwise fails to keep up can stop and use other protocols later to complete its booting process.

An intermediate scheme is to use the acknowledgements to insure the completion of the P-to-S node transfers, but to leave the second stage (S-to-T) node transfers unacknowledged.

Third Stage Forwarding

After the second stage nearly all the nodes have a copy of the data packets representative of the boot image program. An additional elaboration, which provides even greater reliability, is to use an extra "third stage" forwarding step. In one embodiment for a third stage, all nodes forward the data packets on all the nodes to which they are directly connected. This results in a very high probability of reaching every node.

It is needless to forward the data packets to the nodes that are known to have the data packets already, i.e. the nodes from which a data packet was received in the previous stage.

RAM Disk Kernel Booting

The effectiveness of a broadcast booting scheme such as this is increased by being able to send to many nodes all the data that they need to get them completely up and running. The data includes not only the operating system kernel, but also all the files the nodes need to access during the operating system's initialization and startup phase.

For this reason, the collection of files that is sent could be structured as a ramdisk image of the portion of the root file system that is accessed during startup. In the case that the PLEX™ array contains nodes of different types, the data collection may include the superset of all the files needed by any of those node types.

The methods described herein can be embodied in a set of computer readable instructions or codes which can be stored in any computer readable storage medium and can be transferred and downloaded over the Internet.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. A method for fast booting an operating system on a multiprocessor system that is coupled in a two-dimensional array of interconnected nodes, wherein one of the nodes is designated as a primary boot master node which receives a sequence of data packets from an external source, wherein each of said data packets contains a portion of a boot image program and said sequence of data packets collectively represents said boot image program, said method comprising the steps of:
forwarding, by said primary boot master node, a data packet to various nodes to which said primary boot master node is communicatively connected, wherein said nodes receiving the data packet from said primary boot master node are designated as secondary boot master nodes;
forwarding, by each said secondary boot master node, the data packet to various other nodes to which this said secondary boot master node is communicatively connected and which lie in a direction orthogonal to the direction from which this said secondary boot master node has received the data packet from said primary boot master node, wherein said nodes receiving the data packet from said secondary boot master nodes are designated as tertiary nodes;
wherein each node that has received a data packet stores the portion of said boot image program contained in the data packet in its memory for later use, and wherein one node does not send back the data packet to the other node from which said node has received the data packet;
repeating the preceding steps until all portions of said boot image program have been received and forwarded; and
starting the operation system on all nodes.

2. The method of claim 1, further comprising the step of:
forwarding, by each of said tertiary nodes, the data packet to various other nodes to which said tertiary node is communicatively connected.

3. The method of claim 1, further comprising the step of:
sending, by each node that has received a data packet, an acknowledgement packet for each data packet to the node from which it received the data packet.

4. The method of claim 1, wherein said sequence of data packets includes an operating system kernel and all files needed to access said operating system's initialization and startup phase.

5. The method of claim 1, wherein said sequence of data packets is structured as a ramdisk image of a portion of root file system that is accessed during startup phase.

6. The method of claim 1, wherein said sequence of data packets includes a superset of all files needed by any of said nodes.

7. The method of claim 1, wherein each of said data packets includes a hop count field that is incremented each time each such data packet is forwarded.

8. A computer-readable medium on which is stored instructions for executing the steps of claim 1.

9. The computer readable storage medium of claim 8 wherein said set of computer readable instructions can be downloaded over a global telecommunications network.

10. A method for fast booting an operating system on a multiprocessor system that is coupled in a multi-dimensional array of interconnected nodes via a communications network with M orthogonal directions supporting communications between an M dimensional lattice of a multiplicity of nodes each containing a multiplicity of ports, said communications network comprising:
a communication grid interconnecting said nodes, said grid further comprising:
a multiplicity of communication pencils, for each of said M orthogonal directions;
wherein each of said communication pencils in each orthogonal direction is coupled with a corresponding node pencil containing a multiplicity of nodes to couple each of said nodes of said corresponding node pencil directly to the other nodes of said corresponding node pencil;
wherein M is at least two; and
wherein the number of nodes in each of said node pencils in a first of said orthogonal directions is at least four;
wherein the number of nodes in each of said node pencils in a second of said orthogonal directions is at least two;
wherein one of the nodes is designated as a primary boot master node which receives a sequence of data packets from an external source, wherein each of said data packets contains a portion of a boot image program and said sequence of data packets collectively represents said boot image program, and
said method comprising the steps of:
forwarding, by said primary boot master node, a data packet to various nodes to which said primary boot master node is communicatively connected, wherein said nodes receiving the data packet from said primary boot master node are designated as secondary boot master nodes;
forwarding, by each said secondary boot master node, the data packet to various other nodes to which this said secondary boot master node is communicatively connected and which lie in a direction orthogonal to the direction from which this said secondary boot master node has received the data packet from said primary boot master node, wherein said nodes receiving the data packet from said secondary boot master nodes are designated as tertiary nodes;
M−2 additional forwarding steps by nodes that have just received a packet to other nodes that lie in a direction orthogonal to the direction or directions from which the forwarding node has received the packet;

wherein each node that has received a data packet stores the portion of said boot image program contained in the data packet in its memory for later use, and wherein one node does not send back the data packet to the other node from which said node has received the data packet;

repeating the preceding steps until all portions of said boot image program have been received and forwarded; and starting the operation system on all nodes.

11. The method of claim 10, further comprising the step of:

sending, by each node that has received a data packet, an acknowledgement packet for each data packet to the node from which it received the data packet.

12. The method of claim 10, wherein said sequence of data packets includes an operating system kernel and all files needed to access said operating system's initialization and startup phase.

13. The method of claim 10, wherein said sequence of data packets is structured as a ramdisk image of a portion of root file system that is accessed during startup phase.

14. The method of claim 10, wherein said sequence of data packets includes a superset of all files needed by any of said nodes.

15. The method of claim 10, wherein each of said data packets includes a hop count field that is incremented each time each such data packet is forwarded.

16. A computer-readable medium on which is stored instructions for executing the steps of claim 10.

17. The computer readable storage medium of claim 16 wherein said set of computer readable instructions can be downloaded over a global telecommunications network.

18. A method for fast booting an operating system on a multiprocessor system that is coupled in a two-dimensional array of interconnected nodes, wherein one of the nodes is designated as a primary boot master node which receives a sequence of data packets from an external source, wherein each of said data packets contains a portion of a boot image program and said sequence of data packets collectively represents said boot image program, said method comprising the steps of:

forwarding, by said primary boot master node, a data packet to various nodes to which said primary boot master node is communicatively connected, wherein said nodes receiving the data packet from said primary boot master node are designated as secondary boot master nodes;

forwarding, by each said secondary boot master node, the data packet to various other nodes to which this said secondary boot master node is communicatively connected, wherein said nodes receiving the data packet from said secondary boot master nodes are designated as tertiary nodes;

wherein each node that has received a data packet stores the portion of said boot image program contained in the data packet in its memory for later use, and wherein one node does not send back the data packet to the other node from which said node has received the data packet;

repeating the preceding steps until all portions of the boot image program have been received and forwarded; and starting the operation system on all nodes.

19. The method of claim 18, further comprising the step of:

forwarding, by each of said tertiary nodes, the data packet to various other nodes to which this said tertiary node is communicatively connected.

20. The method of claim 18, further comprising the step of:

sending, by each node that has received a data packet, an acknowledgement packet to the node from which it received the data packet.

21. The method of claim 18, wherein said sequence of data packets includes an operating system kernel and all files needed to access said operating system's initialization and startup phase.

22. The method of claim 18, wherein said sequence of data packets is structured as a ramdisk image of a portion of root file system that is accessed during startup phase.

23. The method of claim 18, wherein said sequence of data packet includes a superset of all files needed by any of said nodes.

24. The method of claim 18, wherein each of data packets includes a hop count field that is incremented each time said data packet is forwarded.

25. A computer-readable medium on which is stored instructions for executing the steps of claim 18.

26. The computer readable storage medium of claim 25 wherein said set of computer readable instructions can be downloaded over a global telecommunications network.

27. A method for fast booting an operating system on a multiprocessor system that is coupled in a multi-dimensional array of interconnected nodes via a communications network with M orthogonal directions supporting communications between an M dimensional lattice of a multiplicity of nodes each containing a multiplicity of ports, said communications network comprising:

a communication grid interconnecting said nodes, said grid further comprising:

a multiplicity of communication pencils, for each of said M orthogonal directions;

wherein each of said communication pencils in each orthogonal direction is coupled with a corresponding node pencil containing a multiplicity of nodes to couple each of said nodes of said corresponding node pencil directly to the other nodes of said corresponding node pencil;

wherein M is at least two; and wherein the number of nodes in each of said node pencils in a first of said orthogonal directions is at least four;

wherein the number of nodes in each of said node pencils in a second of said orthogonal directions is at least two;

wherein one of the nodes is designated as a primary boot master node which receives a sequence of data packets from an external source, wherein each of said data packets contains a portion of a boot image program and said sequence of data packets collectively represents said boot image program; and said method comprising the steps of:

forwarding, by said primary boot master node, a data packet to various nodes to which said primary boot master node is communicatively connected, wherein said nodes receiving the data packet from said primary boot master node are designated as secondary boot master nodes;

forwarding, by each said secondary boot master node, the data packet to various other nodes to which this said secondary boot master node is communicatively connected, wherein said nodes receiving the data packet from said secondary boot master nodes are designated as tertiary nodes;

M-2 additional forwarding steps by nodes that have just received a packet, to various other nodes to which they are communicatively coupled;

wherein each node that has received a data packet stores the portion of said boot image program contained in the data packet in its memory for later use, and wherein one node does not send back the data packet to the other node from which said node has received the data packet;

repeating the preceding steps until all portions of the boot image program have been received and forwarded; and starting the operation system on all nodes.

28. The method of claim 27, further comprising the step of:

sending, by each nose that has received a data packet, an acknowledgement packet to the node from which it received the data packet.

29. The method of claim 27, wherein said sequence of data packets includes an operating system kernel and all files needed to access said operating system's initialization and startup phase.

30. The method of claim 27, wherein said sequence of data packets is structured as a ramdisk image of a portion of root file system that is accessed during startup phase.

31. The method of claim 27, wherein said sequence of data packets includes a superset of all files needed by any of said nodes.

32. The method of claim 27, wherein each of said data packets includes a hop count field that is incremented each time each such data packet is forwarded.

33. A computer-readable medium on which is stored instructions for executing the steps of claim 27.

34. The computer readable storage medium of claim 33 wherein said set of computer readable instructions can be downloaded over a global telecommunications network.

35. A method for fast booting an operating system on a multiprocessor system that is coupled in a two-dimensional array of interconnected nodes, wherein one of the nodes is designated as a primary boot master node which receives a sequence of data packets from an external source, wherein each of said data packets contains a portion of a boot image program and said sequence of data packets collectively represents said boot image program, said method comprising the steps of:

forwarding, by said primary boot master node, a data packet to various nodes to which said primary boot master node is communicatively connected and which lie in the same row as said primary boot master node, wherein said nodes receiving the data packet from said primary boot master node are designated as secondary boot master nodes;

forwarding, by each said secondary boot master node, the data packet to various other nodes to which this said secondary boot master node is communicatively connected and which lie in the same column as said primary boot master node, wherein said nodes receiving the data packet from said secondary boot master nodes are designated as tertiary nodes, wherein said primary boot master node acts as a secondary boot master node;

wherein each node that has received a data packet stores the portion of said boot image program contained in the data packet in its memory for later use, and wherein one node does not send back the data packet to the other node from which said node has received the data packet;

repeating the preceding steps until all portions of said boot image program have been received and forwarded; and starting the operation system on all nodes.

36. The method of claim 35, further comprising the step of:

forwarding, by each of said tertiary nodes, the data packet to various other nodes to which this said tertiary node is communicatively connected.

37. The method of claim 35, further comprising the step of:

sending, by each node that has received a data packet, an acknowledgement packet to the node from which it received the data packet.

38. The method of claim 35, wherein said sequence of data packets includes an operating system kernel and all files needed to access said operating system's initialization and startup phase.

39. The method of claim 35, wherein said sequence of data packets is structured as a ramdisk image of a portion of root file system that is accessed during startup phase.

40. The method of claim 35, wherein said sequence of data packets includes a superset of all files needed by any of said nodes.

41. The method of claim 35, wherein each of said data packets includes a hop count field that is incremented each time said data packet is forwarded.

42. A computer-readable medium on which is stored instructions for executing the steps of claim 35.

43. The computer readable storage medium of claim 42 wherein said set of computer readable instructions can be downloaded over a global telecommunications network.

44. A method for fast booting an operating system on a multiprocessor system that is coupled in a multi-dimensional array of interconnected nodes via a communications network with M orthogonal directions supporting communications between an M dimensional lattice of a multiplicity of nodes each containing a multiplicity of ports, said communications network comprising:

a communication grid interconnecting said nodes, said grid further comprising:

a multiplicity of communication pencils, for each of said M orthogonal directions;

wherein each of said communication pencils in each orthogonal direction is coupled with a corresponding node pencil containing a multiplicity of nodes to couple each of said nodes of said corresponding node pencil directly to the other nodes of said corresponding node pencil;

wherein M is at least two; and wherein the number of nodes in each of said node pencils in a first of said orthogonal directions is at least four;

wherein the number of nodes in each of said node pencils in a second of said orthogonal directions is at least two;

wherein one of the nodes is designated as a primary boot master node which receives a sequence of data packets from an external source, wherein each of said data packets contains a portion of a boot image program and said sequence of data packets collectively represents said boot image program, said method comprising the steps of:

forwarding, by said primary boot master node, a data packet to various nodes to which said primary boot master node is communicatively connected and which lie in the same row as said primary boot master node, wherein said nodes receiving the data packet from said primary boot master node are designated as secondary boot master nodes;

forwarding, by each said secondary boot master node, the data packet to various other nodes to which this said secondary boot master node is communicatively connected and which lie in the same column as said primary boot master node, wherein said nodes receiving the data packet from said secondary boot master nodes are designated as tertiary nodes, wherein said primary boot master node acts as a secondary boot master node;

M−2 additional forwarding steps, each step along a different one of the M−2 additional communications directions;

wherein each node that has received a data packet stores the portion of said boot image program contained in the data packet in its memory for later use, and wherein one node does not send back the data packet to the other node from which said node has received the data packet;

repeating the preceding steps until all portions of said boot image program have been received and forwarded; and starting the operation system on all nodes.

45. The method of claim 44, further comprising the step of:

sending, by each node that has received a data packet, an acknowledgement packet to the node from which it received the data packet.

46. The method of claim 44, wherein said sequence of data packets includes an operating system kernel and all files needed to access said operating system's initialization and startup phase.

47. The method of claim 44, wherein said sequence of data packets is structured as a ramdisk image of a portion of root file system that is accessed during startup phase.

48. The method of claim 44, wherein said sequence of data packets includes a superset of all files needed by any of said nodes.

49. The method of claim 44, wherein each of said data packets includes a hop count field that is incremented each time each such data packet is forwarded.

50. A computer-readable medium on which is stored instructions for executing the steps of claim 44.

51. The computer readable storage medium of claim 50, wherein said set of computer readable instructions can be downloaded over a global telecommunications network.

\* \* \* \* \*